United States Patent
Stanforth (10) Patent No.: US 8,037,159 B2
(45) Date of Patent: Oct. 11, 2011

(54) SYSTEM AND METHOD FOR EFFECTING THE SECURE DEPLOYMENT OF NETWORKS

(75) Inventor: Peter J. Stanforth, Winter Springs, FL (US)

(73) Assignee: MeshNetworks, Inc., Lake Mary, FL (US)

( * ) Notice: Subject to any disclaimer, the term of this patent is extended or adjusted under 35 U.S.C. 154(b) by 977 days.

(21) Appl. No.: 11/192,560

(22) Filed: Jul. 29, 2005

(65) Prior Publication Data

US 2006/0059545 A1 Mar. 16, 2006

Related U.S. Application Data

(60) Provisional application No. 60/592,853, filed on Jul. 30, 2004.

(51) Int. Cl.
*G06F 15/177* (2006.01)
*G06F 17/30* (2006.01)
*H04B 1/38* (2006.01)

(52) U.S. Cl. ............... 709/220; 455/558; 726/27

(58) Field of Classification Search ........... 709/220, 709/227; 455/558; 726/27
See application file for complete search history.

(56) References Cited

U.S. PATENT DOCUMENTS

| | | | |
|---|---|---|---|
| 5,081,678 A | 1/1992 | Kaufman | |
| 5,748,720 A * | 5/1998 | Loder | 455/406 |
| 6,052,604 A * | 4/2000 | Bishop et al. | 455/558 |
| 6,460,138 B1 * | 10/2002 | Morris | 713/184 |
| 6,754,188 B1 | 6/2004 | Garahi | |
| 6,807,165 B2 | 10/2004 | Belcea | |
| 6,871,063 B1 * | 3/2005 | Schiffer | 455/410 |
| 6,873,839 B2 * | 3/2005 | Stanforth | 455/343.2 |
| 6,898,430 B1 | 5/2005 | Liberti et al. | |
| 6,959,204 B1 * | 10/2005 | Townend et al. | 455/557 |
| 7,003,282 B1 * | 2/2006 | Ekberg | 455/411 |
| 7,043,238 B2 * | 5/2006 | Ahn et al. | 455/432.1 |
| 7,216,231 B2 * | 5/2007 | Gehrmann | 713/171 |
| 7,218,915 B2 * | 5/2007 | Craven | 455/411 |
| 7,242,294 B2 * | 7/2007 | Warrior et al. | 340/539.22 |
| 7,424,302 B2 * | 9/2008 | Carpenter | 455/466 |
| 7,496,193 B2 * | 2/2009 | Nachef et al. | 379/357.01 |
| 7,503,066 B2 * | 3/2009 | Tatebayashi et al. | 726/17 |
| 7,539,309 B2 * | 5/2009 | Stadelmann et al. | 380/270 |

(Continued)

FOREIGN PATENT DOCUMENTS

EP 1553729 B1 11/2006

(Continued)

OTHER PUBLICATIONS

PCT/US2005/027098, PCT Preliminary Report on Patentability, mailed Feb. 8, 2007, 5 pages.

(Continued)

*Primary Examiner* — Alina N. Boutah
(74) *Attorney, Agent, or Firm* — Randi L. Karpinia (57) ABSTRACT

A system and method for allowing network users to securely administer and deploy network nodes (102). These networks (100) may comprise wired and/or wireless connections. Examples would include wired networks (104) with shared infrastructure in an office building, as well as ad-hoc multi-hopping peer-to-peer network applications for the home. The system and method provides a key (130) that allows new nodes (102) and thus new devices (124, 126, 132) to gain access to a network (100) via an existing node (122) of that network (100).

14 Claims, 5 Drawing Sheets

U.S. PATENT DOCUMENTS

| | | | |
|---|---|---|---|
| 7,657,255 B2 * | 2/2010 | Abel et al. | 455/414.1 |
| 2002/0058502 A1 | 5/2002 | Stanforth | |
| 2002/0087868 A1 | 7/2002 | King et al. | |
| 2002/0120852 A1 * | 8/2002 | Krishnan et al. | 713/185 |
| 2002/0169966 A1 * | 11/2002 | Nyman et al. | 713/182 |
| 2002/0187808 A1 * | 12/2002 | Vallstrom et al. | 455/558 |
| 2003/0061503 A1 * | 3/2003 | Katz et al. | 713/200 |
| 2003/0191939 A1 * | 10/2003 | Tsai et al. | 713/168 |
| 2003/0210787 A1 * | 11/2003 | Billhartz et al. | 380/270 |
| 2004/0024846 A1 * | 2/2004 | Randall et al. | 709/219 |
| 2004/0030791 A1 * | 2/2004 | Dorenbosch et al. | 709/230 |
| 2004/0073792 A1 * | 4/2004 | Noble et al. | 713/168 |
| 2004/0137908 A1 * | 7/2004 | Sinivaara et al. | 455/452.1 |
| 2004/0158716 A1 * | 8/2004 | Turtiainen et al. | 713/172 |
| 2004/0176134 A1 * | 9/2004 | Goldthwaite et al. | 455/558 |
| 2004/0258429 A1 * | 12/2004 | Moroi | 399/80 |
| 2005/0057370 A1 * | 3/2005 | Warrior et al. | 340/870.01 |
| 2005/0094592 A1 * | 5/2005 | Schmidt | 370/328 |
| 2005/0159184 A1 * | 7/2005 | Kerner et al. | 455/558 |
| 2006/0031515 A1 * | 2/2006 | Van Gassel et al. | 709/227 |
| 2006/0052085 A1 * | 3/2006 | Gregrio Rodriguez et al. | 455/411 |
| 2006/0087982 A1 * | 4/2006 | Kuure et al. | 370/252 |
| 2006/0189319 A1 * | 8/2006 | Houldsworth et al. | 455/445 |
| 2006/0270457 A1 * | 11/2006 | Lord | 455/558 |
| 2007/0032195 A1 * | 2/2007 | Kurisko et al. | 455/41.2 |
| 2007/0036096 A1 * | 2/2007 | Sinivaara | 370/318 |
| 2007/0050871 A1 * | 3/2007 | Mashhour | D14/383 |
| 2007/0109989 A1 * | 5/2007 | Nakagawa et al. | 370/328 |
| 2007/0226805 A1 * | 9/2007 | Jeal et al. | 726/27 |
| 2008/0069105 A1 * | 3/2008 | Costa et al. | 370/392 |
| 2008/0109331 A1 * | 5/2008 | Stadelmann et al. | 705/34 |
| 2008/0200147 A1 * | 8/2008 | Nylander et al. | 455/411 |
| 2008/0295159 A1 * | 11/2008 | Sentinelli | 726/6 |

FOREIGN PATENT DOCUMENTS

| | | |
|---|---|---|
| JP | 2004007351 A | 1/2004 |
| WO | 0239677 A1 | 5/2002 |
| WO | 03098816 A2 | 5/2003 |

OTHER PUBLICATIONS

Korean Patent Office, Korean Application No. 10-2007-7002181, Office Action [translated], Rejection, email dated Feb. 28, 2008, 3 pages.

German Patent Office, Korean Application No. 11 2005 001 833.4-31, Office Action [translated], dated Jul. 15, 2010, 4 pages.

Translation of German Patent Office Action dated Jul. 15, 2010—4 pages—IDS filed Sep. 27, 2010. (citing DE 602005000281 T2 which is the German translation of EP 1553729, now cited) (citing Japanese Ref. 2004007351).

* cited by examiner

FIG. 5

SYSTEM AND METHOD FOR EFFECTING THE SECURE DEPLOYMENT OF NETWORKS

This application claims the benefit of U.S. Provisional Application No. 60/592,853, filed Jul. 30, 2004, the entire content being incorporated herein by reference.

FIELD OF THE INVENTION

The present invention relates to a system and method for enabling users to securely administer and deploy nodes in a network, such as an ad-hoc multi-hopping network. More particularly, the present invention relates to a system and method employing a key that is used to authenticate new devices being added to an existing network.

BACKGROUND

In recent years, a type of mobile communications network known as an "ad-hoc" network has been developed. In this type of network, each mobile node is capable of operating as a base station or router for the other mobile nodes, thus eliminating the need for a fixed infrastructure of base stations. As can be appreciated by one skilled in the art, network nodes transmit and receive data packet communications in a multiplexed format, such as time-division multiple access (TDMA) format, code-division multiple access (CDMA) format, or frequency-division multiple access (FDMA) format.

More sophisticated ad-hoc networks are also being developed which, in addition to enabling mobile nodes to communicate with each other as in a conventional ad-hoc network, further enable the mobile nodes to access a fixed network and thus communicate with other mobile nodes, such as those on the public switched telephone network (PSTN), and on other networks such as the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", filed on Jun. 29, 2001, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", filed on Mar. 22, 2001, and in U.S. Pat. No. 6,873,839 entitled "Prioritized-Routing for an Ad-Hoc, Peer-to-Peer, Mobile Radio Access System", filed on Mar. 22, 2001, the entire content of each being incorporated herein by reference.

Ad-hoc and mesh networks, both wired and wireless, have become increasingly pervasive in various industrial and commercial markets. These types of networks are also becoming available for use in consumer markets for digital home applications, as well as many others including business offices, concerts, conventions, small businesses, and farms.

Applications in the home include next generation security systems, multi media distribution, computer networking, and home control functions. These may exist as independent networks or, more likely, over time they will be integrated into a single multi-function network. All of these networks comprise a number of nodes, and, in an integrated network of sensors, control and multimedia sections could reasonably be anticipated to include a hundred nodes or more.

The ability of a typical consumer, such as a homeowner, to deploy these nodes quickly and simply is crucial to their commercial success. Each device can be a small low cost component of the system, either stand alone, like a sensor, or an integrated part of a device like a stereo system. Commercial and military systems that exist demonstrate that such systems today are very difficult to deploy and manage, since issues such as administration and security are of great concern. Convincing consumers that these networks are easy to deploy and secure is thus paramount to their success. These issues apply similarly to users in other settings, such as small office settings and the like. A need therefore exists for a tool that will enable users, especially technically unsophisticated users, to more easily administer and deploy such nodes in networks such as ad-hoc peer-to-peer networks.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a system and method for enabling users to securely administer and deploy nodes in a network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a system and method for enabling users to securely administer and deploy nodes in a network described herein. The non-processor circuits may include, but are not limited to, a radio receiver, a radio transmitter, signal drivers, clock circuits, power source circuits, and user input devices. As such, these functions may be interpreted as steps of a method to perform operations for enabling users to securely administer and deploy nodes in a network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

As will now be discussed in more detail, the present invention provides a system and method for enabling users to administer and deploy nodes in a network that comprises wired and/or wireless connections. Examples would include wired networks with shared infrastructure in an office building, as well as ad hoc and peer-to-peer network applications for the home. In particular, the system and method employs a key that is used to validate new devices to enable the new devices to gain access to an existing network.

Figure 1:
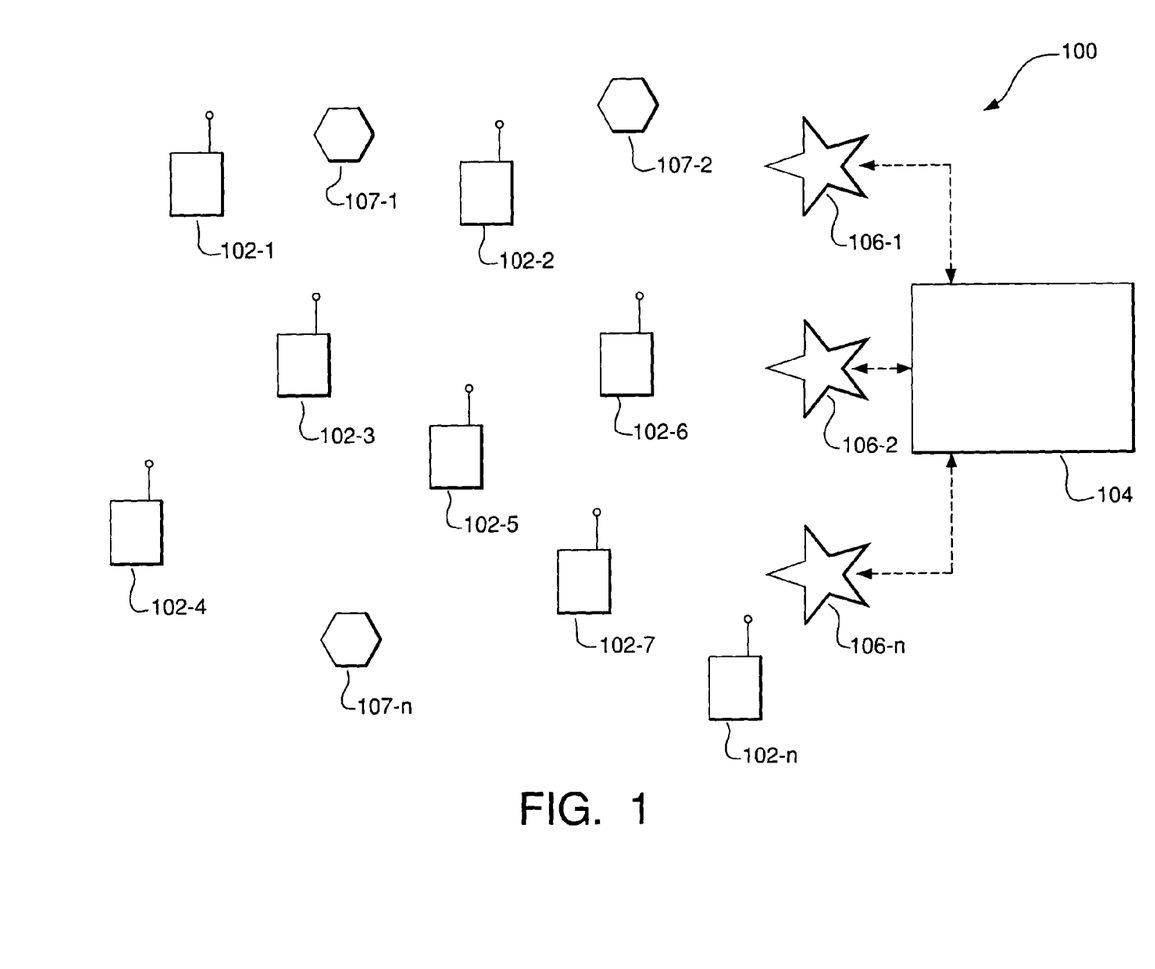
FIG. 1 is a block diagram of an example ad-hoc wireless communications network including a plurality of nodes employing a system and method in accordance with an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102, user nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. Nos. 7,072,650, 6,807,165, and 6,873,839 referenced above.

Figure 2:
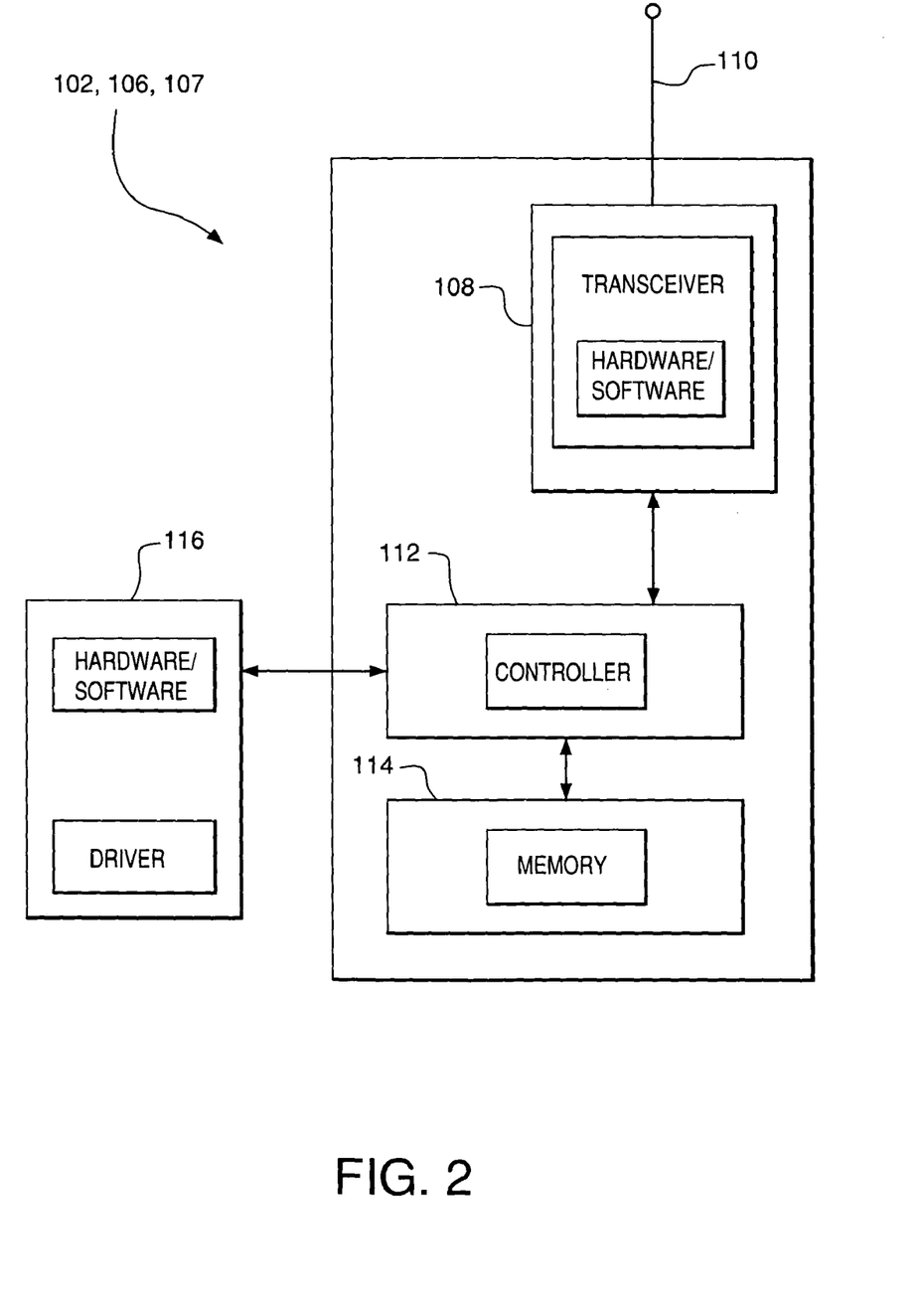
FIG. 2 is a block diagram illustrating an example of a mobile node employed in the network shown in FIG. 1.

As shown in FIG. 2, each node 102, 106 and 107 includes a transceiver, or modem 108, which is coupled to an antenna 110 and is capable of receiving and transmitting signals, such as packetized signals, to and from the node 102, 106 or 107, under the control of a controller 112. The packetized data signals can include, for example, voice, data or multimedia information, and packetized control signals, including node update information.

Each node 102, 106 and 107 further includes a memory 114, such as a random access memory (RAM) that is capable of storing, among other things, routing information pertaining to itself and other nodes in the network 100. As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

Figure 3:
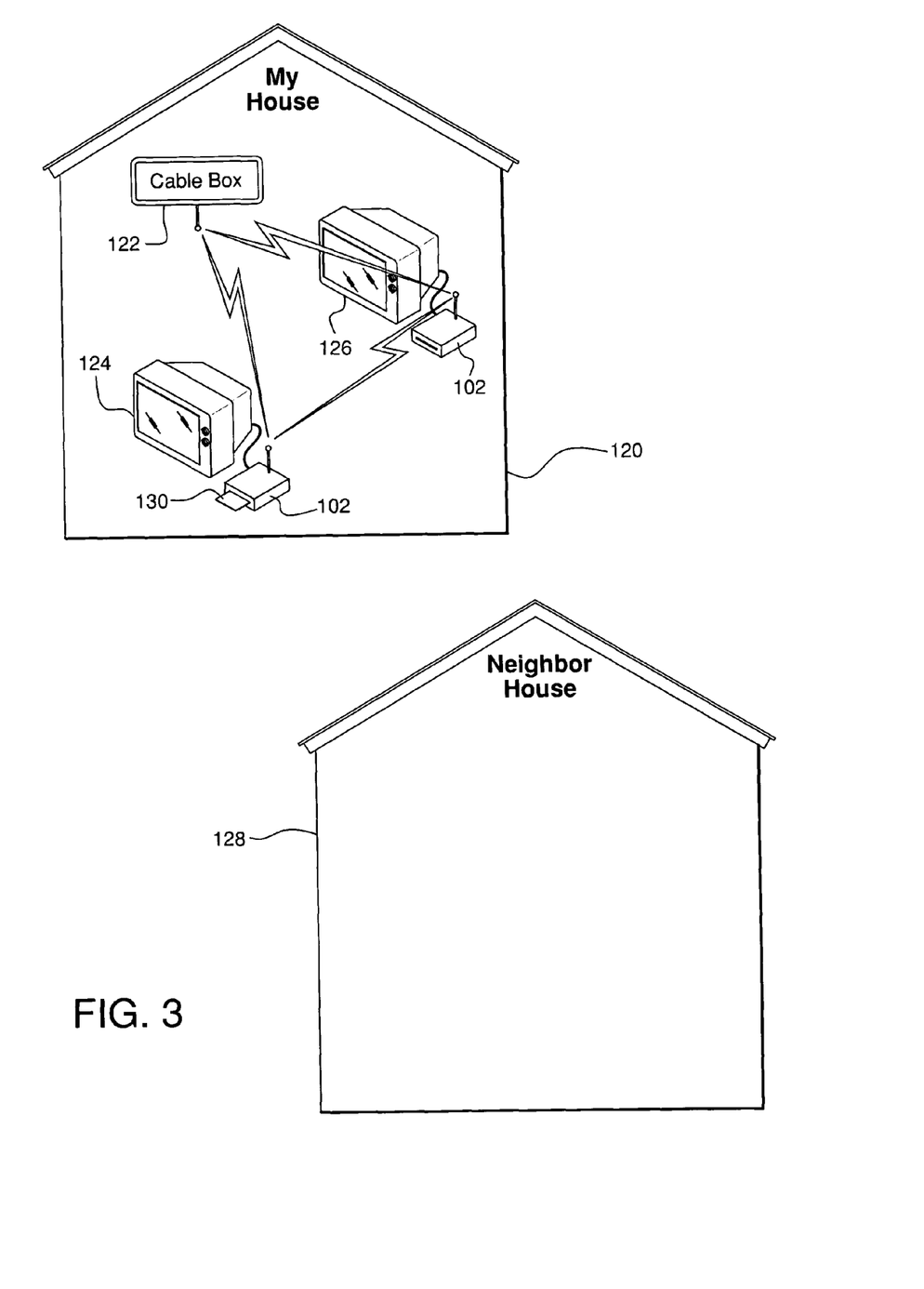
FIG. 3 is a block diagram illustrating deployment of a network as shown in FIG. 1 in a residential environment according to an embodiment of the present invention.
Figure 4:
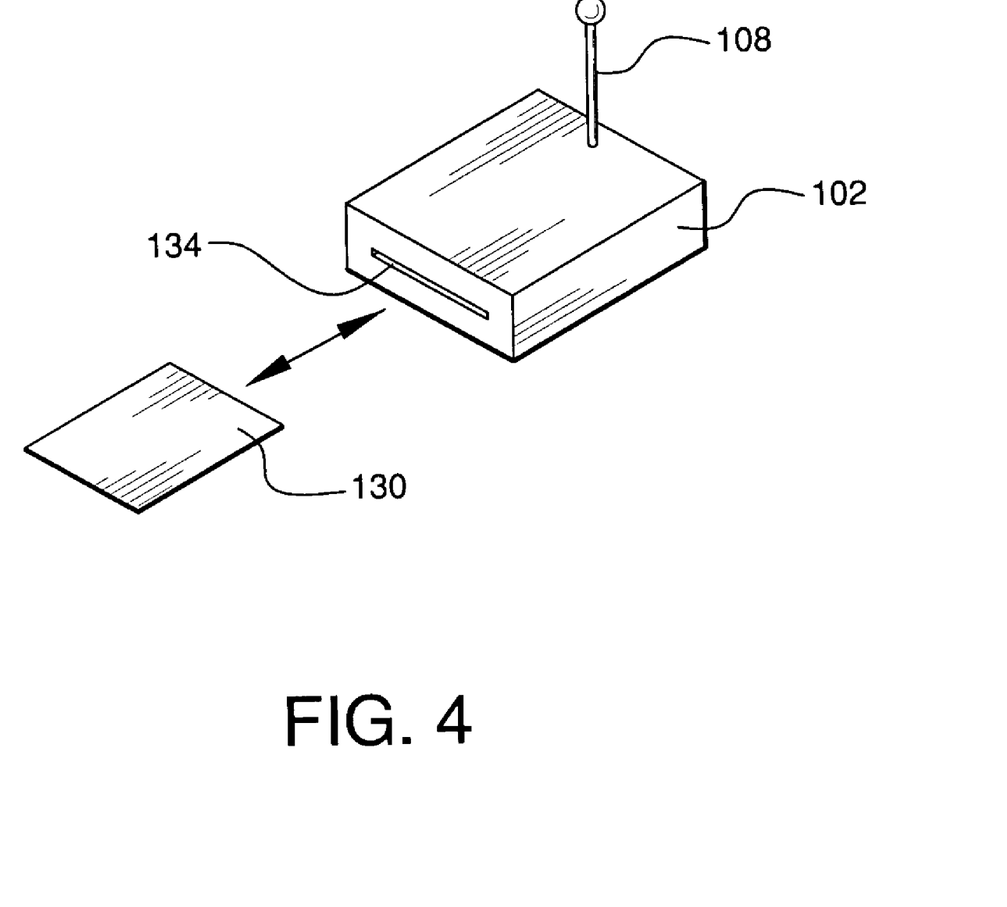
FIG. 4 is a block diagram illustrating an example of a key being used with a node of the network as shown in FIG. 1 according to an embodiment of the present invention.
Figure 5:
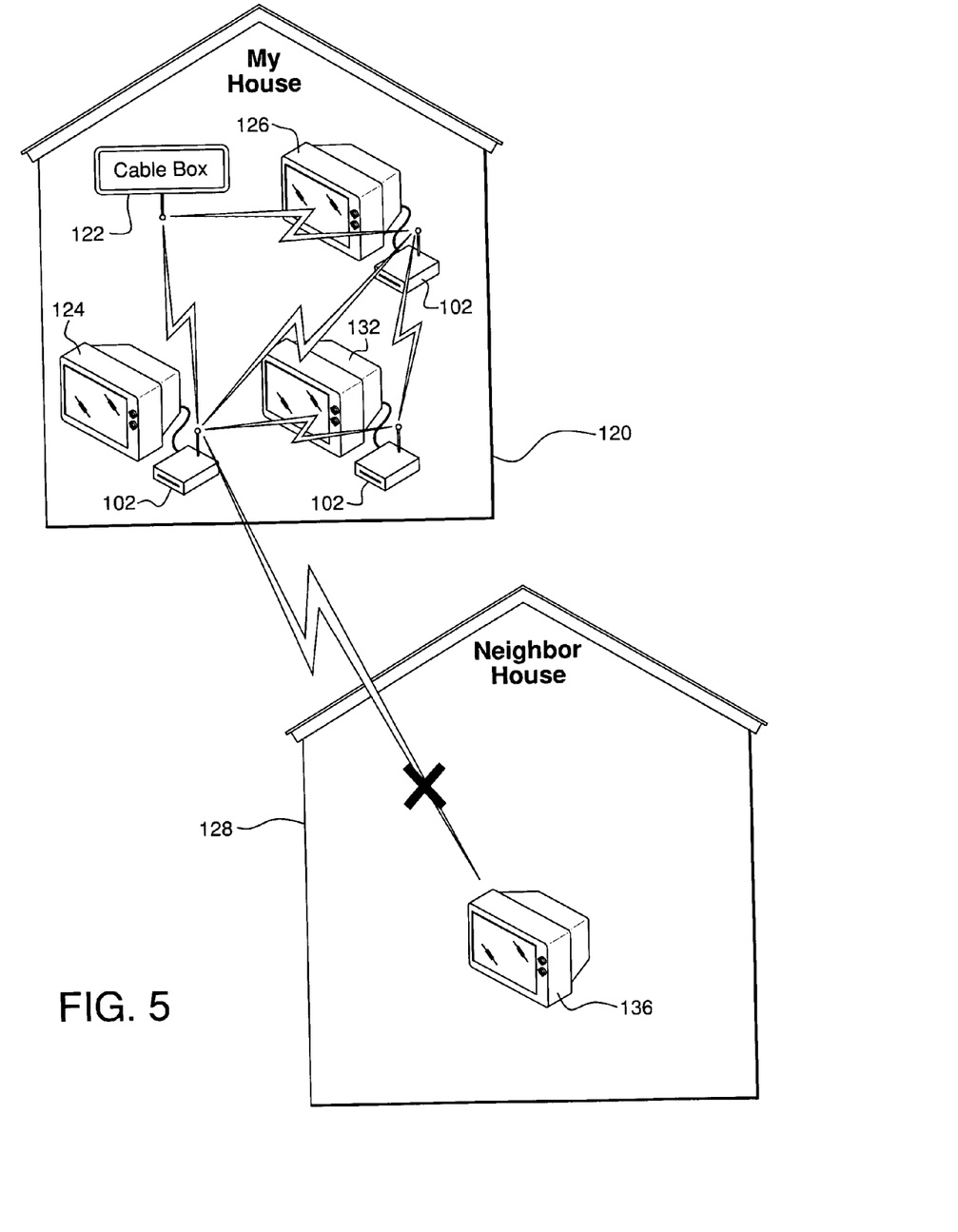
FIG. 5 is a block diagram illustrating deployment of a network as shown in FIG. 1 in a residential environment in which the key as shown in FIG. 4 allows access to certain nodes according to an embodiment of the present invention.

An example of a scenario for using the type of network discussed above with regard to FIGS. 1 and 2 according to an embodiment of the present invention is demonstrated in FIGS. 3-5. Specifically, a consumer in house 120 starting with a first device 122 in a network, such as a set top box or cable box, a home multimedia computer, a stereo, a cable modem, or a home control center, is capable of adding other devices to the network. This first device 122 can employ a node, such as an access point 106, as discussed above. In particular, the consumer may wish to add more devices to extend the capabilities into other rooms or to add security sensors, audio components, printers, computers or any of a variety of other devices. At the same time the consumer will want to ensure that similar devices purchased by a neighbor in house 128 will not be able to access the consumer's network, and the consumer will not want his or her devices to inadvertently become part of or be interfered with by the neighbor's network.

The present invention therefore provides a system method by which the first device 122 can confirm that a new device, such as device 124 or 126, is a device that the consumer intends to be part of the network. Preferably, this will require minimal technical involvement or expertise on the part of the consumer.

The present invention therefore provides a key 130, as shown in more detail in FIG. 4, which is an item that is related to the first device 122. This key 122 is capable of being recognized and associated with the first device 122. As indicated, a node, such as a user node 102, is connected or otherwise associated with each new device 124 and 126 being added to the network. The key 122 is capable of being at least temporarily inserted into the nodes 102 associated with the new devices 124 and 126, or otherwise at least temporarily associated with each of the nodes 102 associated with the new devices 124 and 126, to confirm to the first device 122 that the nodes 102 and thus, their respective devices 124 and 126, are approved for use in the network. The first device 122 can store, for example, respective identification information representing a respective node 102 that has been validated for use by the key 130, so that the key 130 can be removed from that node 102 and put away or used to validate another node 102.

Thus, the consumer simply has to insert the key 130 for a brief period into slot 134 of the node 102, which can contain a typical card reader, universal serial bus (USB) port, or any other suitable device, while powering up a new device 124 or 126 and its respective node 102, thus allowing the new device 124 or 126 to be authenticated with the first device 122 or other previously authenticated devices so that the new device 124 or 126 can become part of the network. As shown in FIG. 5, when a consumer wishes to add another new device 132 to the network after devices 124 or 126 have already been authenticated, the first device 122, or any of the previously authenticated devices 124 or 126, can authenticate that new device 132 in a manner similar to that in which the first device 122 authenticates the new device 132 as discussed above. As further shown in FIG. 5, the consumer can be confident that without the key 130, no device, such as device 136 in the neighbor's home 128, will be able to gain access to the consumer's network.

Although the key 130 is shown as a hardware component in FIG. 4, as can be appreciated by one skilled in the art, the key 130 may take a number of forms. For example, the key 130 could be a physical electronic key as shown, or the key could be similar in design to a cellular telephone subscriber identity module (SIM) card, a computer USB drive or a camera smart media card. Also, the key 130 can be a radio frequency identification (RFID) card which, as appreciated by one skilled in the art, would not need to be inserted into the node 102, but simply placed in very close proximity (e.g., several inches or less) to the new node 102 associated with the new device. A key 130 configured as a card with a degree of data storage or processing would allow for increased security, improved installation, and improved provisioning. With such capabilities, the first device 122 could store useful information about the network, such as available radio frequency (RF) channels, cryptographic key information, configuration data, identities, performance criteria, billing information, and so on, that would become part of the operating mode of the newly added device 124, 126 or 132. Smart keys could also be used for adder services. For example, a key 130 could allow only a predetermined number of devices to be added, or allow certain kinds of features and services to be enabled. Such capabilities would facilitate the administration of pay-as-you-go or pay-for-service models so that, for example, a security company could charge fees based on the number of security sensors or a cable company could charge fees based on the number of movies watched. Although such capabilities are not required for the basic creation of the network, they could be useful as part of a deployment configuration.

Although the examples above have focused on household network applications, the present invention is capable of being implemented in any network setting where new devices might be added. These networks may comprise wired and/or wireless connections. Examples would include wired networks with shared infrastructure in an office building, as well as ad hoc and peer-to-peer network applications for the home. The present invention could also find use in event venues such as concerts, sporting events, and conventions.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A network, comprising: at least one active node having access to the network; a plurality of secondary nodes; and a key, for storing information that is readable by the active node, wherein the key is temporarily physically connected with any one of the plurality of secondary nodes; the active node validates the plurality of secondary nodes each time the key is physically connected with any one of the plurality of secondary nodes, and permits the any one of the plurality of secondary nodes to access the network after the key has been physically disconnected from the plurality of secondary nodes, wherein the active node and each of the plurality of secondary nodes wirelessly communicate with each other in an ad-hoc multihopping network.

2. The network of claim 1, wherein: the key comprises a physical device to couple to any one of the plurality of secondary nodes, such that the plurality of secondary nodes provide the information to the at least one active node.

3. The network of claim 2, wherein: the key comprises a card for insertion into a port in the plurality of secondary nodes.

4. The network of claim 1, wherein: each of the plurality of secondary nodes are associated with a device, such that each of the plurality of secondary nodes provide the device with access to the network via each of the plurality of secondary nodes and the active node.

5. The network of claim 4, wherein:
the information on the key enables the device to access certain features of the network, wherein the stored information is one of an available radio frequency (RF) channels, a cryptographic key information, a configuration data, performance criteria, and a billing information.

6. The network of claim 1, wherein: the active node is a node that has been previously authenticated by the key to have access to the network.

7. A method for deploying a network by a user, the method comprising: deploying at least one active node having access to the network; deploying a plurality of secondary nodes; providing a key, for storing information that is readable by the active node, and physically connecting the key with any one of the plurality of secondary nodes; and operating the active node to validate the plurality of secondary nodes each time the key is physically connected with any one of the plurality of secondary nodes, so that the active node permits the any one of the plurality of secondary nodes to access the network system after the key has been physically disconnected from the plurality of secondary nodes, wherein the active node and the plurality of secondary nodes wirelessly communicate with each other in an ad-hoc multihopping network.

8. The method of claim 7, wherein: the key comprises a physical device; the physically connecting operation comprises coupling the key to any one of the plurality of secondary nodes; and the method further comprises operating each of the plurality of secondary nodes to provide the information to the active node.

9. The method of claim 8, wherein: the key comprises a card; and the physically connecting further comprises inserting the key into a port in each of the plurality of secondary nodes.

10. The method of claim 7, wherein the physically connecting operation further comprises temporarily physically connecting the key with any one of the plurality of secondary nodes; and the operating step comprises operating the active node to validate the plurality of secondary nodes each time the key is physically connected with any one of the plurality of secondary nodes to permit the any one of the secondary nodes to access the network.

11. The method of claim 7, wherein: each of the plurality of secondary nodes is associated with a device; and the method further comprises operating each of the plurality of secondary nodes to provide the device with access to the network via each of the plurality of secondary nodes and the active node.

12. The method of claim 11, wherein: the information on the key enables the device to access certain features of the network.

13. The method of claim 7, wherein:
the physically connecting operation comprises placing the key proximate to any one of the plurality of secondary nodes without touching the any one of the plurality of secondary nodes.

14. The method of claim 7, wherein: the active node is a node that has been previously authenticated by the key to have access to the network.

* * * * *